United States Patent [19]

Lee et al.

[11] Patent Number: 4,917,390
[45] Date of Patent: Apr. 17, 1990

[54] HYDRAULIC SEAL ASSEMBLY

[75] Inventors: John Lee, Palos Verdes Peninsula; Richard J. Vernon, Long Beach; Robert Janian, Encino; David A. Rossi, Newport Beach; Stanley E. Charles, La Canada, all of Calif.

[73] Assignee: Tetrafluor, Inc., El Segundo, Calif.

[21] Appl. No.: 275,896

[22] Filed: Nov. 25, 1988

[51] Int. Cl.⁴ .................... F16J 15/24; F16J 15/32
[52] U.S. Cl. ..................................... 277/165; 277/176; 277/177
[58] Field of Search ............... 277/165, 177, 208, 176

[56] References Cited

U.S. PATENT DOCUMENTS

| | | | |
|---|---|---|---|
| 2,841,429 | 7/1958 | McGuistan | 277/188 A |
| 3,366,392 | 1/1968 | Kennel | 277/177 |
| 3,663,024 | 5/1972 | Traub | 277/165 |
| 3,909,016 | 9/1975 | Traub et al. | 277/165 |
| 3,942,806 | 3/1976 | Edlund | 277/165 |
| 4,449,718 | 5/1984 | Muller | 277/165 X |
| 4,702,482 | 10/1987 | Oseman | 277/165 |
| 4,720,113 | 1/1988 | Hertz, Jr. | 277/165 |

FOREIGN PATENT DOCUMENTS

| | | | |
|---|---|---|---|
| 2448607 | 4/1975 | Fed. Rep. of Germany | 277/165 |
| 2447583 | 4/1976 | Fed. Rep. of Germany | 277/177 |

Primary Examiner—Allan N. Shoap
Attorney, Agent, or Firm—Cislo & Thomas

[57] ABSTRACT

An improved seal for use in a hydraulic system such as a piston rod in a housing, the seal having a stressing member and sealing member in which the latter is in point contact with, for example, a piston rod under low fluid pressure and has an additional contact area with the piston rod under high fluid pressure; a shallow concavity between the point contact and the contact area entraps lubricating fluid when the seal is subjected to high fluid pressure. In another modification the sealing member has an incline on the face in contact with the stressing member so that under high fluid pressure, the stressing member is forced up the incline and thus exerts increased pressure through the sealing member against the contact area and produces an effective high fluid pressure seal. In still another embodiment the sealing member has a concave surface to receive the stressing member such that it is centered, during low pressure operation, over a sealing contact area of the sealing member.

9 Claims, 1 Drawing Sheet

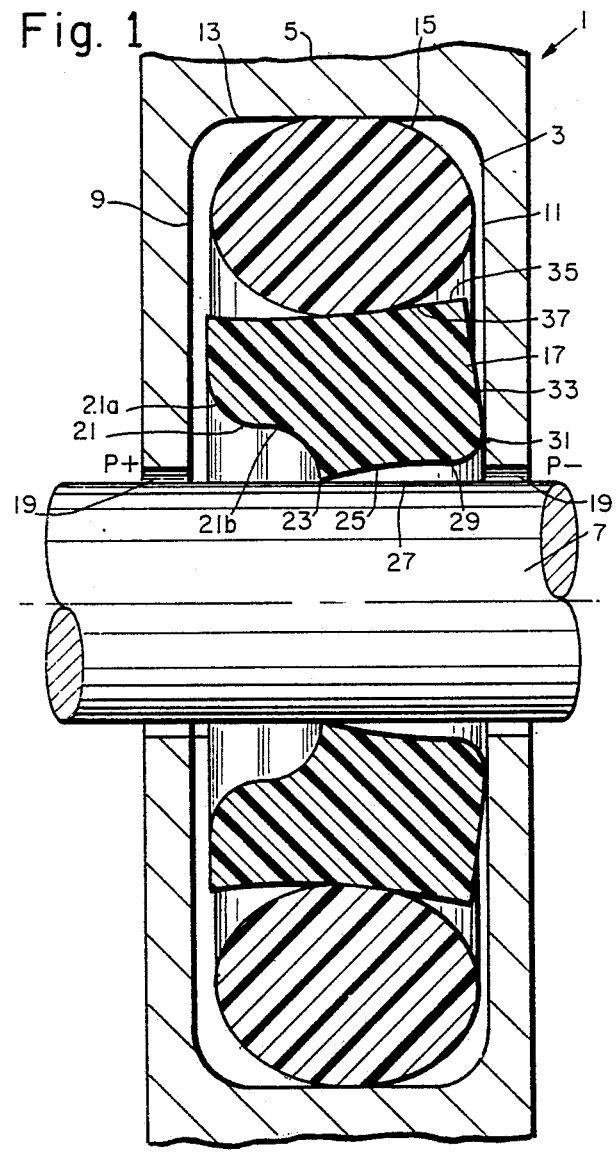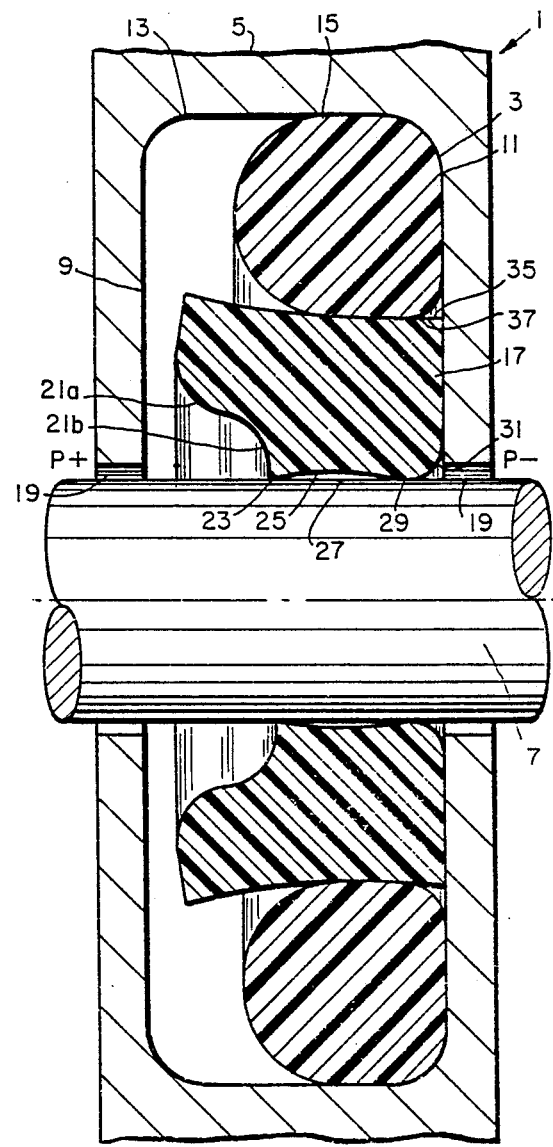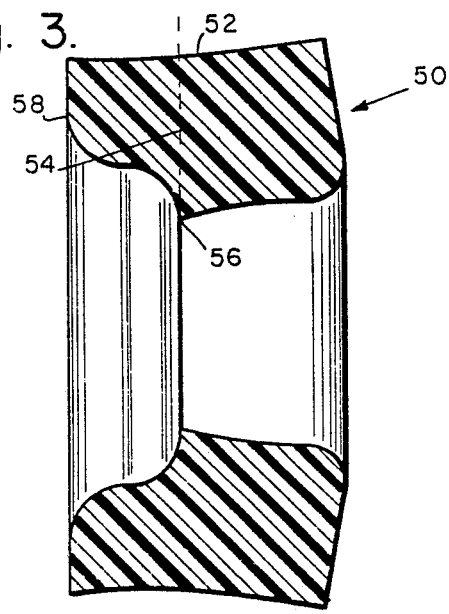

HYDRAULIC SEAL ASSEMBLY

BACKGROUND OF THE INVENTION

This invention relates to a sealing structure which may be used with hydraulically operated pistons or piston rods. It is particularly useful in sealing structures which alternately are exposed to high and low fluid pressures.

As noted in U.S. Pat. No. 3,909,016, entitled "Seal Assembly with Pivotable Slipper Seal", it is particularly difficult to obtain a good fluid seal, especially when the seal is subjected to high and low pressures alternately. To overcome that problem, that patent describes a device for use with two relatively movable machine parts. It uses a specially designed slipper seal, as a sealing member, in conjunction with an O-ring or other compressive force which are mounted in one of the machine parts. The device is designed in such a way that when it is subjected to low fluid pressure the slipper seal is in contact with the second machine part, such as a piston, through a corner of the slipper seal; this results in a very small frictional force but yet prevents leakage in the low pressure system. When the seal is subject to high fluid pressure, the compressive force of the O-ring is shifted to rotate the slipper seal and bring the entire surface of the slipper seal facing the second machine part into contact with that part. This surface of the slipper seal has no undercuts or voids so that it conforms to that surface of the second machine part.

A second sealing device is presented in U.S. Pat. No. 3,942,806, entitled "Sealing Ring Structure". In this patent, the low pressure contact point of the sealing member is defined by the intersection of a cylindrical recess which extends axially inwardly from one end of the sealing member and a radially inwardly inclined conical recess which extends axially inward from the opposite end of the sealing member. As with the invention in U.S. Pat. No. 3,909,061, under low fluid pressure, a sharp corner of the sealing member is in contact with the second machine part, but under high fluid pressure the entire face of the sealing member opposite the second machine part is compressed against that part.

A third U.S. Pat. No. 4,449,718, entitled "Packing for Hydraulic Pistons or Piston Rods" shows a modification of the device described in U.S. Pat. No. 3,942,806. The lower end of the radial face of the cylindrical recess is sloped to form a 45° angle with the radial axis of the point contact. This is done to facilitate loading the packing ring onto the piston or other moving parts without distorting or damaging the contact area through material displacement.

A fourth U.S. Pat. No. 3,663,024 entitled "Sealing Assembly" shows a sealing member having a curvilinear configuration adopted to co-act with an O-ring to facilitate disposition of one member with the other.

OBJECTS AND SUMMARY OF THE INVENTION

It is an object of this invention to provide an improved rod seal for use in machines having moving parts.

It is a further object of this invention to provide a rod seal in which the sealing member has a point contact under low fluid pressure plus a contact area displaced from the point contact under high fluid pressure.

It is a further object of the present invention to provide a sealing member which has a shallow concavity between two contact surfaces to retain fluid when the seal member is pressed against another machine part under high fluid pressure, thus minimizing friction between the sealing member and the moving part and reducing wear of the sealing member.

It is a further object of the present invention to provide a sealing member wherein the right angle configurations of the prior art structures are minimized, thus reducing stress and stress-concentration, related failure.

It is an additional object of the present invention to provide an incline on the side of the sealing member in contact with the compressive member so that under high fluid pressure the compression on the high pressure contact area is increased.

In order to illustrate the invention, it will be described in connection with a housing around a piston rod. The rod seal is in an annular groove in the housing, and it comprises a sealing member and a stressing or compressive member. The sealing member has four sides and two areas which come in contact with the piston rod. The first area is a point contact which is formed at the bottom end of a generally S-shaped or toroidal curve on a first side of the sealing member, i.e., the side facing a high pressure port located at the base of the housing. The S-shaped curve has a convex upper portion running primarily axially and somewhat radially and a concave lower portion running primarily radially.

A shallow concavity extends substantially the length of a second side of the sealing member; this side faces the piston rod. The intersection of the first and second sides form a point contact.

The second side terminates in an arc which forms a second contact area with the piston rod under high fluid pressure; the arc then extends upward and towards the low pressure side. When the system is subjected to high fluid pressure both the point contact and a section of the arc are pressed against the piston rod by increased pressure caused by rotation of the the stressing member toward the low pressure side. The contact point and the contact area form a small dam between the sealing member and the piston rod, and the entrapped liquid provides lubrication to extend the life of the system. The contact area of the arc should be adjusted to the needs of the system in order to provide a complete seal when the system is subjected to high fluid pressure but not more than necessary; otherwise it creates too much drag on the system.

The third side is substantially straight and runs towards the stressing member from the end of the arc that is remote from the second side. Under low fluid pressure, the third side forms a V-shaped groove with the radial wall on the low pressure side of the annular groove; the portion of the third side adjacent to the arc is in contact with said wall. The groove facilitates rotation of the sealing member when fluid pressure is increased or decreased. When the system is subjected to high fluid pressure, the entire third side is forced against the side of the groove by rotation of the seal member around the point contact and increased pressure from the stressing member.

The fourth side of the sealing member runs between the first side and the third side; it is slightly curved to center the stressing member under low pressure. In a preferred embodiment, it has an incline or ramp on the surface facing the stressing member. The ramp may be a slope or a shallow concavity. As the fluid pressure increases, the stressing member is forced to the low pressure side. Because the ramp has increased the thickness of the sealing member at that end, the stressing member exerts increased pressure on the arc contact area, thus assuring a good fluid seal at that point. This ramp is particularly effective when the stressing member is an O-ring.

The fourth side will preferably have an axial portion commencing at the intersection with the first side and the ramp or slope will begin approximately one-third to one-half the distance from the first side. The ramp or slope preferably will form an angle of about 5° to 10° with a straight line continuation of the initial axial portion of this side.

It is important that the sealing member be able to rotate around the point contact. This permits the contact area of the arc to come into contact with the piston rod and the side of the sealing member facing the low pressure port can form a seal against the wall of the groove under high fluid pressure. By the same token, the ability to rotate around the point contact is needed so that under low fluid pressure the arc area of the sealing member will rotate up and away from the piston rod and the third side will rotate away from the inside wall of the groove except at its lower end. A rotation of about 5° to about 10° is desirable, and it preferably will be about 7° to 9°. When the second or arc seal is broken, it minimizes the drag on the total system and significantly reduces frictional wear on the parts.

The sealing member and the stressing member may be made of fluoroplastic material such as polytetrafluoroethylene, filled compositions thereof or other high modulus plastic materials used in high pressure systems. The stressing member will usually be an elastomeric ring, such as an O-ring.

While the invention has been described wherein the seal is mounted in a stationary portion of the machine, it should be understood that the invention is equally adaptable for use in the movable or rotating portion of the machine. It also may be employed in butterfly valves, ball valves, gate valves and the like.

BRIEF DESCRIPTION OF THE DRAWING

FIG. 1 is a fragmented cross-section through a seal rod structure of the present invention comprising a sealing member and a stressing member under low fluid pressure in an annular groove in the stationary portion of a machine. In addition, it shows the relationship of these parts to the rotating member or piston rod.

FIG. 2 is a fragmented cross-section through the same structure of FIG. 1 when the system is under high fluid pressure.

FIG. 3 is a fragmented view of another embodiment of the invention.

DESCRIPTION OF THE BEST EMBODIMENTS CONTEMPLATED

Referring now to the drawings wherein like numerals of reference refer to like elements throughout, FIG. 1 shows a rod seal construction generally at 1 under low fluid pressure. It includes an annular groove 3 in stationary member 5 (showing in fragment only) and rod 7. Annular groove 3 is formed by radially extending walls 9 and 11 which are connected by axially wall 13.

Within groove 3 is a concentric stressing member illustrated in the drawing as O-ring 15, which under the influence of low fluid pressure abuts against axial wall 13; it is superimposed on an annular sealing member which, in this embodiment, is polytetrafluoroethylene or polytetrafluoroethylene compound ring 17. Between stationary member 5 and rod 7, there is an annular passage 19. As indicated by the symbol P+ and P−, the high pressure side is on the left side of stationary member 5 and the low fluid pressure side is on the right side.

The unique sealing section 17 of the present invention has a double curved or toroidal structure 21 along most of the side facing wall 9. The upper portion of double curve 21 is convex section 21a and the lower portion is concave portion 21b. Concave portion 21b terminates in a steep slope or at a 90° angle where it is in contact with piston rod 7 at point 23. Side 25 which faces rod 7 has a shallow concavity 27 beginning at contact point 23 and running axially for substantially all the length of side 25. The end of shallow concavity 27 nearest to wall 11 is rounded at point 29 and then forms arc 31 of approximately 90° or more running upwards and outward towards wall 11. Side 25, point 29 and arc 31 together are toroidal.

Side 33 of sealing section 17 is essentially straight and faces wall 11. Side 35 is the side which is remote from rod 7. It has a ramp or slope running toward the low pressure side from a point approximately radially removed from the contact point 23. The ramp or slope may be an inclined plane but is preferably a slight concavity.

FIG. 1 illustrates the rod seal of the present invention under low fluid pressure. The only contact between sealing ring 17 and rod 7 is at contact point 23. The lowermost portion or arc 31 of side 33 is in contact with wall 11. The sealing member 15 sits approximately in the middle of side 35 where it is radially above point contact 23 and exerts some compressive force on sealing ring 17 by virtue of its contact with axially wall 13.

FIG. 2 shows the rod seal of the present invention under high fluid pressure. In this embodiment, stressing member 15 and sealing member 17 have been forced to the right and are compressed against wall 11. Sealing member 17 has been forced downward so that point 29 of arc 31 is in sealing contact with piston rod 7; some of the fluid is thus trapped in concavity 27. Side 33 abuts wall 11 and O-ring 15 is also in contact with wall 11.

When the high fluid pressure is removed, O-ring 15 moves towards the left and sealing member 17 rotates around contact point 23 so that the seal at point 29 is broken and side 33 is in contact with wall 11 only at its end where the upper end of arc 31 terminates. This causes the entire structure to again take the relationship shown in FIG. 1.

Referring now to FIG. 3, one half of the sealing member 50, another embodiment of the rod seal of the invention, is shown. Herein the seal 50 is similar in all respects to the seal previously described except for having a curvilinear surface 52 which has a concave upper surface to receive therein an O-ring, not shown, such that at low pressure operation, the O-ring is centered along the lotted line 54 so that an alignment with the center of the O-ring and the sealing point 56 of seal 50 takes place.

Additionally, where large cross-section seals are contemplated, the portion 58 of the seal 50 or for that matter the seal shown in FIGS. 2 and 3 may be flat instead of curved.

The embodiment of this invention which has been shown in the figures and described herein is exemplary only. Changes, modifications, and substitutions will be obvious to those with ordinary skill in the art without departing from the spirit and scope of this invention.

I claim:

1. An annular compressive seal for use in a hydraulic system, said seal having a first, second, third and fourth side;
   (a) the first side being toroidal in shape along a substantial portion of its length, comprising a convex upper portion running axially and radially and extending radially inwardly to merge into a concave portion running axially and radially;
   (b) the second side running substantially axially from the end of the concave portion of the first side but having a shallow concavity along substantially its entire length;
   (c) an arc running axially and radially from the second side at its end remote from the first side, the second side and the arc together being toroidal in shape;
   (d) a third side running in substantially a straight line and radially from the arc; and
   (e) a fourth side axially connecting the first and third side and having a slight curve inward;
   the intersection of the first and second sides forming a point contact, and a portion of the arc adjoining the second side forming a contact area.

2. The compressive seal of claim 1 wherein the fourth side forms an incline running toward the third side from a point about one-third to one-half the distance from the first side.

3. In a hydraulic seal for effecting a fluid seal between a pair of machine parts and comprising an annular sealing member and an annular stressing member in an annular groove in one machine part, the improvement consisting in the annular sealing member having a first, second, third and fourth side,
   (a) the first side being toroidal in shape along a substantial portion of its length comprising a convex upper portion running axially and radially and extending radially inwardly to merge into a concave portion running axially and radially;
   (b) the second side running substantially axially from the end of the concave portion of the first side but having a shallow concavity along substantially its entire length;
   (c) an arc running axially and radially from the second side at its end remote from the first side, the second side and the arc together being toroidal in shape;
   (d) a third side running substantially in a straight line and radially from the arc, and forming a V-shaped groove, under low fluid pressure with an adjacent radial wall of the annular groove;
   (e) a fourth side axially connecting the first and third side,
   the intersection of the first and second sides forming a point contact, and a portion of the arc adjoining the second side forming a contact area under high fluid pressure.

4. The rod seal according to claim 1 wherein the sealing member and the stressing member are formed from a tough resilient fluoroplastic material.

5. The assembly according to claim 1 wherein the stressing member is an elastomeric spring.

6. The assembly according to claim 1 wherein the stressing member is an O-ring.

7. The assembly according to claim 1 wherein the pair of machine parts comprise a housing and a piston rod.

8. The compressive seal of claim 3 wherein said fourth side of said sealing member is provided with an upper convex surface to receive said annular stressing member in perpendicular aligned relationship to a point contact formed by said V-shaped groove of said third side under low fluid pressure.

9. A hydraulic seal assembly for effecting a seal between a piston rod and a housing wherein the seal assembly is located in a annular groove in the housing and is subjected to a high fluid pressure level and a lower fluid pressure level, said assembly comprising an annular stressing member and an annular sealing member wherein the annular stressing member is an elastomeric ring and the annular sealing member is a polytetrafluoreothylene ring having first, second, third and fourth side,
   (a) the first side being toroidal in shape along a substantial portion of its length comprising a convex upper portion running axially and radially and extending radially inwardly to merge into a concave lower portion running axially and radially;
   (b) the second side running substantially axially from the end of the concave portion of the first side but having a shallow concavity along substantially its entire length;
   (c) an arc running axially and radially from the second side at its end remote from the first side, the second side and the arc together being toroidal in shape;
   (d) a third side running substantially in a straight line and radially from the arc, and forming a V-shaped groove, under low fluid pressure with an adjacent radial wall of the annular groove;
   (e) a fourth side axially connecting the first and third side,
   the intersection of the first and second sides forming a point contact, and a portion of the arc adjoining the second side forming a contact area under high fluid pressure.

* * * * *